United States Patent [19]

DeBiasse

[11] Patent Number: 4,984,544
[45] Date of Patent: Jan. 15, 1991

[54] LUBRICATING MEANS FOR PIN CONNECTED RELATIVELY ROTATABLE ENGINE PART AND METHOD OF LUBRICATION

[76] Inventor: Richard L. DeBiasse, 8 Rockledge Trail, Chatham, N.J. 07928

[21] Appl. No.: 443,258

[22] Filed: Nov. 29, 1989

[51] Int. Cl.$^5$ .............................................. F02B 75/32
[52] U.S. Cl. .................... 123/197 AC; 92/159; 384/381; 184/6.8; 74/605; 74/587; 123/196 R
[58] Field of Search ........ 123/197 AC, 193 P, 196 R; 92/159, 160; 384/381, 322; 184/6.8; 74/605, 587

[56] References Cited

U.S. PATENT DOCUMENTS 4,450,797 5/1984 Moser et al. ................. 123/197 AC
4,915,067 4/1990 Imajo ..................................... 184/6.5

Primary Examiner—E. Rollins Cross
Attorney, Agent, or Firm—Dann, Dorfman, Herrell and Skillman

[57] ABSTRACT

A lubricating system is provided at a junction of relatively rotatable members of an engine in an environment where oil comes into contact with the external surface of the rotatable members. The junction includes a relatively rotatable member provided with a bore and pin extending through the bore. The pin is snugly received in the bore so that rotation between the pin and relatively rotatable member may occur. An example of such a system is provided by the wrist pin connection to a piston. According to the invention, within the bore are recesses spaced inwardly and separated from both ends of the bore and arranged diametrically opposed to each other on a line transverse to the principal linear movement of the wrist pin. A pocket for oil is provided by each of the recesses between the bore of the rotatable member and the pin for accumulation of oil to lubricate between the surfaces of the pin and bore. The recesses may also be connected to an oil-splattered surface by a duct sufficiently small to inhibit pressure within the recess from forcing oil outward, but capable of sucking oil inward from the oil-splattered outer surface.

31 Claims, 3 Drawing Sheets

LUBRICATING MEANS FOR PIN CONNECTED RELATIVELY ROTATABLE ENGINE PART AND METHOD OF LUBRICATION

The present invention relates to a lubricating system for relatively rotatable parts connected by a pin. More specifically, it concerns a configuration in the bore of the rotatable member enabling entrapment of a pocket of oil which can be distributed around the pin.

BACKGROUND OF THE INVENTION

In engines of different types and particularly piston engines there are a number of places where a pin or shaft rotates relative to a member. That member or the pin or both may be subject to movement. In today's engine such relatively rotatable junctions are rarely designed to be immersed in the oil in the crank case. Instead, typically lubrication of joints on the crank shaft is accomplished by providing ducts through the crank shaft to individual bearing areas. An oil pump supplies oil to an oil gallery of ducts in the engine block connected to the crank shaft through the main bearings. The oil supplied to the bearings is under high pressure which causes the oil to spread out through the bearing and beyond onto the surface of the crank shaft. Oil on the crank shaft is flung off to lubricate other parts of the engine, particularly the cylinders and their pistons. Remote rotational joints like the wrist pin between the piston and its connecting rod receive a heavy splattering of oil on exposed surfaces. It is expected that some oil will work its way into the very limited space between a pin and the bore of a piston or a connecting rod. Thus in such remote locations, lubrication depends upon the relatively small amount of oil splashing from the crank shaft some distance up into the cylinders, for example.

A typical remote junction between a pin and a linkage member which is subject to some relative rotation is the wrist pin connection which connects the piston rod to the piston. In such a location there is essentially no pressure on the oil splashed into the area to urge the oil into the space between the bore and the pin. Nevertheless, some lubrication does occur at the wrist pin and any other locations which, like the wrist pin, are subject to receiving oil splash periodically. However, the amount of lubrication has never been totally satisfactory in such locations. The more power that is demanded from a given piston displacement, the more a better mode of lubrication is needed. Even relatively well lubricated junctions like the crank shaft could be better lubricated to great advantage.

Various means of supplementing lubrication from the exposed ends of the bore have been tried, for example, channels through the link member to the bore in various types of configurations. Unfortunately all such techniques have had limited success and a great need still exists for a more satisfactory means of lubricating in this splashed oil type of environment.

THE NATURE OF THE PRESENT INVENTION

The present invention is directed to a lubricating system in which a shallow pocket is provided within a bore to trap oil or other lubricants. Such a pocket tends to perform better when it is located generally parallel to translational movement of the pin due to the force acting to drive the mechanism. For example, in driving a piston a piston rod applies great force up and then great force down to the wrist pin coupling it to the piston. This force produces a small transverse movement of the pin relative to the bore. When a pocket for the oil is provided laterally or extending generally parallel to the transverse movement of the pin in accordance with the present invention, oil which is trapped in the pocket tends to be moved around the pin by fluid pressure and by the accompanying rotational movement. The oil is also moved into the greater opening that is created on the side of the bore away from the transverse movement of the pin. The vacuum developed as a void opens between the pin and the bore as well as fluid pressure created along the side of the pin where the oil is compressed aids in drawing the oil into the void, as does capillary attraction. Between these forces and the rotation, the oil gets distributed a substantial distance around the pin. If such pockets are provided in the bore on each side of the pin so that a plane through the axis of the pin transverse to the linear movement intersects the pockets, lubrication is greatly improved and readily distributed around the pin within the bore. As the transverse force moves the pin in the opposite direction, the other side of the bore opens slightly and as oil is squeezed out of the closing side back into a pocket, oil also moves into the opening side.

Even if the pockets are not located in the preferred position some improvement in lubrication is realized by their use.

More specifically, the present invention relates to a lubricating configuration in an engine for a junction of relatively rotatable members in an environment where oil is available to be fed between the rotatable members. In this configuration a relatively rotatable member is provided with a bore. A member having a cylindrical bearing portion extends through that bore and is snugly received therein, but so that rotation will occur between the cylindrical portion and the relatively rotatable member in use. As used herein the term "cylindrical bearing portion" can mean a pin, a shaft or other relatively rotatable members having a cylindrical surface contacted by the bore or a bushing or sleeve bearing within the bore. Also, the bushing or sleeve bearing, if movable relative to the bore, may be considered the cylindrical bearing surface. The bore is provided with at least one recess, preferably of crescent shaped cross section in a plane perpendicular to the bore axis, whereby a pocket is provided between the bore of the member and the pin for accumulation of oil to lubricate the surfaces between the pin and the bore.

Preferably, a pair of opposed recesses are employed in a plane transverse to the major direction of the minute linear movement of the cylindrical bearing surface transverse to the axis. This ideal is not practical in certain sleeve bearings, for example, but is to be approximate wherever possible.

In many applications a duct of diameter sufficiently small to inhibit back flow from the recess is provided between the recess and a surface of the relatively rotatable member exposed to splashed oil. In other words, the duct does not necessarily prevent back flow but is too small to permit a significant amount of back flow. At the same time creation of a partial vacuum as oil is drawn out of recess provides suction to draw inward to the recess oil splashed on the external surface.

In other situations, as at the crank shaft, oil may be pumped through ducts into the bearing area.

DESCRIPTION OF THE DRAWINGS

Referring to FIG. 1 there is schematically shown some of the parts of an engine block which may have a need for the present invention. Engine block 10 contains a plurality of cylinders 14. Each cylinder contains a piston 12 connected by a piston rod 16 to a common crank shaft 18. Crank shaft 18 rotates in an engine block 10 and is sealed at opposite ends by bearing and seal assemblies (not shown). Counter weights 22 are provided periodically along the crank shaft 18 to balance piston effects.

FIGS. 2 and 3 represent a typical piston assembly employing a lubricating system in accordance with the present invention. The piston 12 as shown in FIGS. 2 and 3 is a machined aluminum piston having a cast aluminum head 32. Disposed on diametrically opposite sides of the head 32 are a pair of part-way-round main skirts 34 and 36 each having an angular extent around the head of less than 90°. Each of the mentioned skirts is integral with and depends from a peripheral portion of the bottom of the head. The bottoms of skirts 34 and 36 are designed to be in contact with opposite sides of the wall of a cylinder 14 formed in engine block 10, and in which the piston 12 moves in reciprocating motion generally along the cylinder axis.

Disposed below the bottom of head 32 and cast integrally with that head are a pair of parallel structural mirror image walls 40 and 42 extending laterally between the skirts 34 and 36 and integrally cast with the skirts. The walls 40 and 42 and the skirts 34 and 36 together form a box frame which makes the configuration more rigid, even the cantilever edges of the skirts. The walls 40 and 42 are themselves lightweight and cutouts 44, for example, further reduce the weight. The walls are also symmetrical in relation to an imaginary diametrical plane passing through the piston axis and through the skirts 34, 36.

Figures 2, 3:
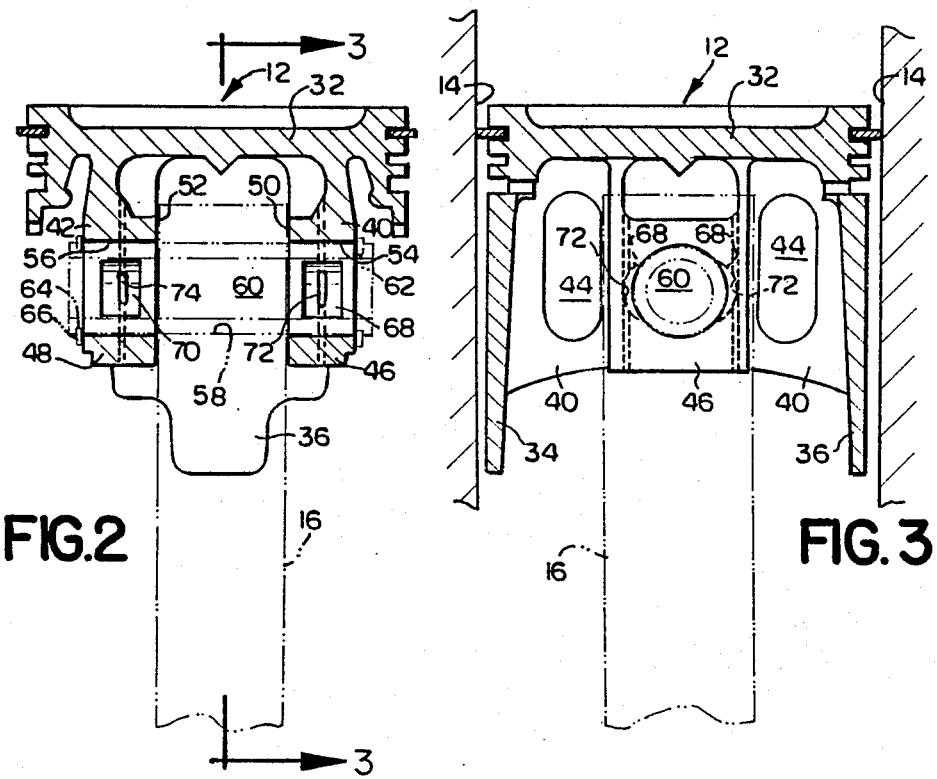
FIG. 2 is an axial sectional view of a piston according to the invention showing its connection to a piston rod by a wrist pin.
FIG. 3 is a sectional view taken along line 3—3 of FIG. 2 and showing the piston rod 16 in phantom.

As illustrated in FIGS. 2 and 3, the wall structures 40 and 42 have central bearing block portions or bosses 46 and 48 which are transversely thickened and have flat parallel opposing vertical faces 50 and 52 (FIG. 2) between which the end of the piston rod 16 fits. Formed through bearing block portions 46 and 48 are axially aligned cylindrical bores 54 and 56 at a level such that there is substantial room or clearance for the end of the piston between the top of the bore and the bottom of head 31. The bearing block portions 46 and 48 serve to support a wrist pin 60 which is received in bores 54 and 56 and bore 58 of like diameter through piston rod 16.

The pin 60 thus serves to couple piston 12 to piston rod 16. Because the bores 54 and 56 are disposed well below the bottom portions of head 32, adequate room is provided beneath the head for the upper end piston rod 16 to move as necessary in operation. To prevent sliding of the pin 60 out of the bores in which it is received, the pin 60 has at each end an annular slot 62, 64 in which is received a removable split retaining ring 66 of larger diameter than the bores.

Within the bores 54, 56 are recesses 68, 70. The preferred form of the recess is shown in which the recesses in plan, as seen in FIG. 2, tend to be generally rectangular in form, although other shapes may be employed. As seen in FIG. 3, the recesses in section are preferably crescent shaped. The crescent shape is not necessary to the functioning, but aids in efficiency of the desired action. It is believed recesses of some cross section providing a pronounced end wall might induce turbulence and interfere with smooth flow of oil, but would be functional to varying extents. Oil is drawn into the recesses to form pockets of oil by capillary attraction along the surfaces between the wrist pin and the bores.

It is possible also to provide small ducts, which in practice are preferably bores, here shown as generally tangential ducts 72 and 74 which can supply more oil by suction from the splashed surfaces than is supplied by capillary attraction. The ducts must be quite small to inhibit passage of oil within the recess back out of the recess due to transient high oil pressure built up within the recess at various times during each cycle. The ducts may be radial rather than tangential, or come from any other external surface which is likely to receive an adequate supply of splattered oil. Just as it is possible for the invention to function without bores at all, it is possible to use a bore into just one of the recesses. In such event, the bore location selected is preferably the one subject to lesser splashed oil supply.

Figure 4:
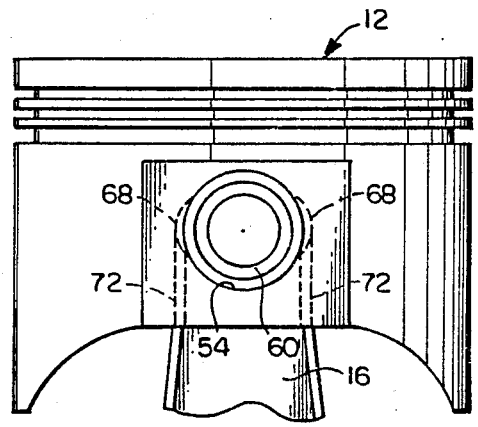
FIG. 4 is an enlarged schematic representation of a section taken through the bearing block perpendicular to the axis of the bore, greatly exaggerating the space between the wrist pin and the bore and showing the structure at rest.
Figure 5:
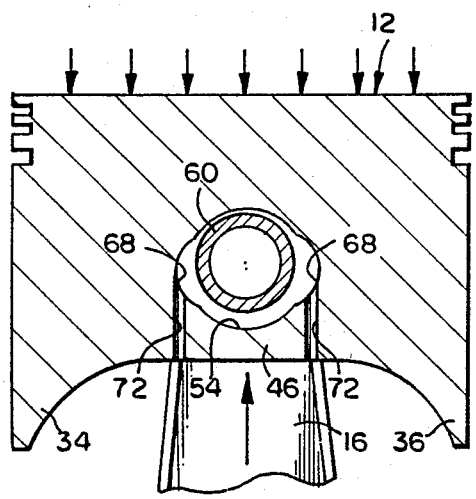
FIG. 5 is a schematic drawing similar to FIG. 4, but showing the wrist pin in the position it assumes as the force of combustion acts in opposition to the rod moving the piston into the cylinder.
Figure 6:
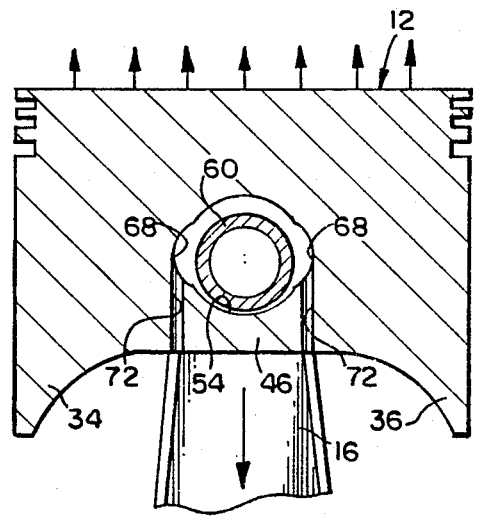
FIG. 6 is a schematic drawing similar to FIG. 4, but showing the wrist pin in the position it assumes as the rod withdraws the piston from the cylinder.

Referring now to FIGS. 4, 5 and 6, the schematic drawings show an enlarged region around the wrist pin wherein the clearance is greatly exaggerated to more clearly show the action in the space in which oil is moved by the reciprocating movement of the pin 60. Each of these schematic drawings represents a similar section taken through the same structure, and specifically through the bore in the area of the recesses so as to show the open recesses in cross section. It will be understood that the recesses may be dimensioned differently within a fairly wide range but cannot extend laterally (in the sense of FIG. 2) to the edges of the bores. Also, although the recesses are advantageously generally rectangular or oblong in plan, as seen in FIG. 2, they may assume other shapes as well. However, the crescent cross section is the preferable form whatever the peripheral shape.

The theory of operation is not totally understood, but it is believed that oil will be drawn into the bore along the wrist pin by capillary attraction or in a greater amount through the duct. When a pocket is provided, oil will tend to accumulate in that pocket, increasing the demand for additional oil to be drawn into the space, which continues during startup until the recess is full. At some point the pocket will be essentially full and the oil in the pocket and between the pin and bore will experience cyclic pressures as the pin is driven up to drive the piston into the cylinder, as on the compression cycle, for example. The normal clearance between the pin and the bore needed to permit free rotation is sufficient to accommodate a film of oil extending between the pin and the bore. Without the pocket, lubrication between the pin and the bore may often be insufficient and spotty, resulting in wear, noise and, in some cases, rapid mechanical damage. However, with the recess or pocket of oil in that part of the bore where the lubrication is least likely to penetrate, several factors appear to be at work. In particular, pressure tends to build up in the oil as it is squeezed from between the pin and the bore driving it away from the pressure point. The build-up of pressure is transmitted through the fluid and aids other forces which cause the oil to move away from the application of force and into the void which is created by that movement. With every stroke of the piston the direction changes both ways and lubrication tends to follow the direction change in moving out of the pockets. Added to this effect is the rotational movement which occurs between the wrist pin and the piston which tends further to spread oil moved into a particular region. Since the rotation also manifests itself as a reciprocation, oil is moved further circumferentially around the surfaces and tends to better cover the entire region being lubricated.

It can be understood that recesses are far more effective if placed on both sides of the bore relative to the general direction of linear movement than if placed on only one side, but, of course, whatever lubrication is accomplished is an improvement. It will be understood from the above explanation that opening the recesses to the ends of the bore will defeat the purposes of the recesses since this will allow pressure to be dissipated by squeezing oil out of the end of the recesses instead of forcing it around the circumference. However, as will appear below when a floating sleeve bearing is used, ideal positioning is not possible in all cases, and just as the ideal may be achieved from time to time, the ineffective position may also be achieved.

When the ducts 72 and 74 are employed, it is important that they be kept extremely small. The criterion for operability is that the ducts not be so large as to permit oil under pressure in the recesses to be squeezed out, but be sufficiently large to allow a slow pumping of oil inwardly through the ducts to permit the oil to build up in the recesses. As previously mentioned, the movement of the pins causes a cyclic action so that at some times the pressure on the oil would be effectively negative causing it to suck or draw the oil through the bore 72 into the recess. Since the duct is so small, when pressure occurs, the pressure is unable to force the oil more than a short distance into the duct before line friction inhibits the flow. Thus the action tends to provide a cyclic inward pumping of oil to the bearing surface. Ducts are self cleaning because of the constant flow of oil within the ducts.

The present invention has been illustrated primarily with regard to a wrist pin connection for a piston and only the piston connection has been shown in detail. The wrist pin also passes through the piston rod, but the assumption has been that this junction is fixed and not subject to relative rotational movement. If the wrist pin moves relative to the piston rod 16, lubrication in the piston rod bore also becomes desirable and the same kind of lubrication can be provided in this location.

Figure 1:
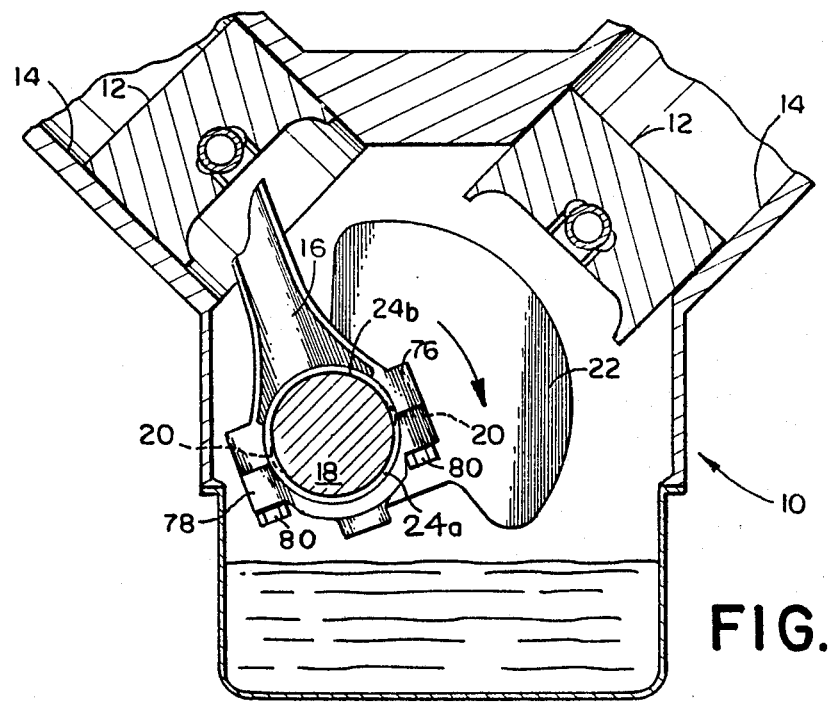
FIG. 1 is a highly schematic sectional view of part of an engine taken in a plurality of transverse planes to show a piston rod connection to the crank and sections through two different cylinders in the V configuration.

Furthermore, the recesses can be provided in a forced oil lubrication environment at the crank shaft. In that location there are also at least two pieces which rotate relative to one another, one of the pieces being a pin or shaft. Often an intermediate sleeve bearing may also be employed. FIG. 1 provides an example of lubrication according to the invention at the crank shaft in the situation where the sleeve bearing has a "crush fit" to the bore, and hence does not rotate relative thereto. In this situation the sleeve bearing, rather than the piston rod, is shown provided with opposed recesses 20. Since this is an area of forced lubrication through the crank shaft, there is no need for other ducts.

Figure 7:
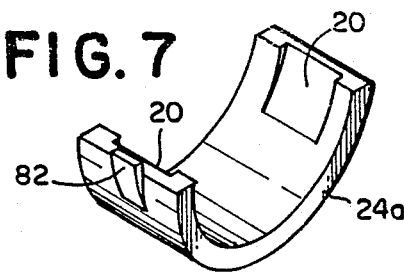
FIG. 7 is a perspective view showing one piece of the sleeve bearing seen in FIG. 1.

FIG. 7 illustrates half of a sleeve bearing for a standard rod bearing. The sleeve is split into two pieces 24a and 24b (FIG. 1) for ease in putting in place around the cylindrical bearing portion of the crank shaft. In addition to a "crushing" effect imposed by tightening the clamp pieces 76 and 78 using the bolts 80, there may be provided a key piece 82 at any selected point around the periphery, but conveniently at one of the break points to fit into a mating portion in member 78. Similarly a member of the same sort may also be used in the upper bearing member 24b to fit in a mating portion of member 76. Such a key, of course, has the function of holding the bearings circumferentially in place. More than one key may be used on each bearing piece as desired. Completely different patterns and arrangements may be employed for the same purpose. This type of bearing, since it does not move relative to the supporting piston rod, does not require lubrication on its outer surface. Lubrication is required, however, between the inner bearing surface and the crank shaft 18. This is facilitated by use of the crescent-shaped recesses or pockets in essentially the same way it is done at the wrist pin. It is to be noted, however, that in most crank shafts today, there is no need for ducts to the outer surface. The reason for this is the presence of lubricating ducts through the crank shaft connected to the oil gallery in the engine block which terminate at the bearing surface. These ducts are not shown, but are conventional in many types of engines and usually provide positive oil pressure through the use of an oil pump. Oil in excess of what is needed at the crank shaft is pumped out of the bearing area and exudes onto the shaft around the bearings to be flung out and lubricate the cylinders and other parts, such as the wrist pin. The pockets of the present invention help to keep oil in the region needing lubrication.

Figure 9:
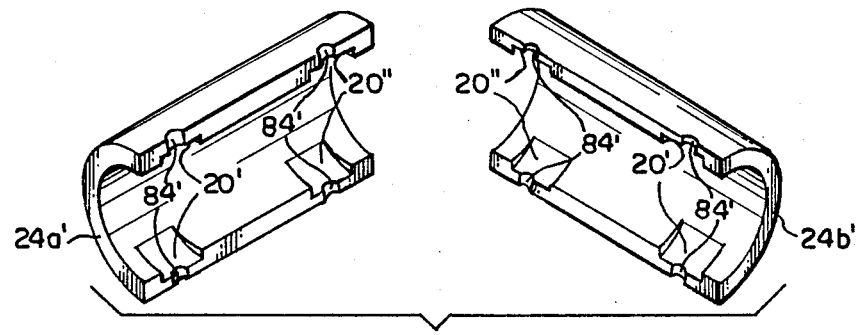
FIG. 9 shows both halves of the modified sleeve bearing of FIG. 8.
Figure 8:
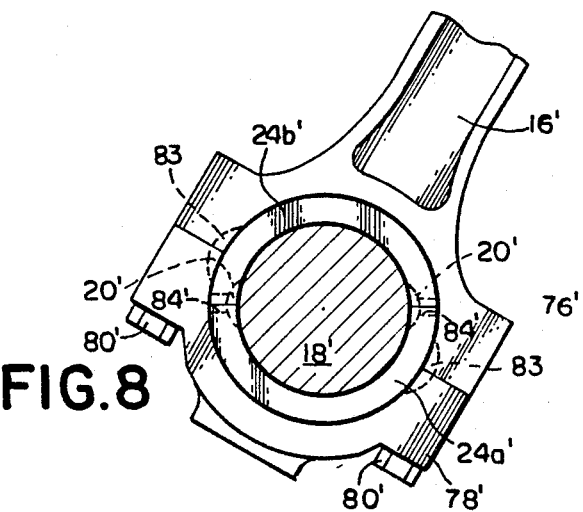
FIG. 8 shows a modified bearing arranged for a pair of connecting rods in a V-configured engine employing a common sleeve bearing for the two rods.

FIGS. 8 and 9 show a variation on the sleeve bearing of FIGS. 1 and 7, in which a split thick shell rotating bearing is provided along a section of crank shaft 18' and accommodates two piston rods. In this case, the bearing sections 24a' and 24b' extend along the shaft 18' a sufficient distance to provide bearing surfaces for two piston rods, only one of which is shown in FIG. 8. However, because the same bearing serves for the two piston rods, it must have the ability to move relative both to the piston rods and to the crank. Under those circumstances, lubrication must be provided both inside and outside of the sleeve bearing. Lubrication inside is provided by opposed recesses 20' and 20" for collecting pockets of oil typically supplied by forced lubrication. Convenience in fabrication is one reason for location of the recesses at the dividing line between the halves of the sleeve bearing 24a', 24b', both recesses for the same crank shaft being numbered the same. Since the oil is fed under pressure to the surface of the shaft 18", the inner surface of sleeve bearing 24a', 24b' is well lubricated, particularly so with the aid of recesses 20' and 20". However, the outer surface of the bearing is not so easily lubricated and to insure the lubrication ducts 84' and 84" are provided from the recesses 20', 20" through the bearing. They can be at other locations than at the dividing line between the bearing halves as shown. The ducts 84", 84" also need not restrict flow like ducts 72 and are preferably sufficiently large to permit easy flow to the outside surfaces of the sleeve bearing. Recesses 83 are provided in the bore of the piston rod between the separable pieces 76' and 78' held together by bolts 80'. That way there will be a layer of lubricating oil provided both inside and outside of the sleeve bearing with pockets in both locations to collect and better distribute the oil in accordance with the present invention.

Recesses may alternatively also be placed in the pin or shaft instead of in the bores, or the outer surface of the bushing or bearing, and will function similarly. However, ducting cannot be provided, or as conveniently provided, in such locations. Further modifications of the invention will occur to those skilled in the art. All such modifications within the scope of the appended claims are intended to be within the scope and spirit of the present invention.

I claim:

1. A lubricating configuration in an engine for a junction of relatively rotatable members in an environment where oil is available to be fed between the rotatable members, comprising
    a relatively rotatable member provided with a bore; and
    a member having a cylindrical bearing portion extending through said bore and snugly received therein so that rotation between the cylindrical portion and the relatively rotatable member may occur,
    wherein at least one recess within the bore is provided spaced inwardly from both ends of the bore whereby a pocket is provided between the bore of the member and the cylindrical portion for accumulation of oil to lubricate between the surfaces of the cylindrical portion and the bore.

2. The lubricating configuration for the engine of claim 1 in which a pair of recesses are provided on opposite sides of the bore from one another spaced inwardly from both ends of the bore.

3. The lubricating configuration of claim 2 in which the recesses are generally rectangular in their peripheral configuration in the bore.

4. The lubricating configuration of claim 1, in which the recess within the bore is of crescent shaped cross section in the plane perpendicular to the axis.

5. The lubricating configuration of claim 3 in which the recesses within the bore are of crescent shape cross section in a plane perpendicular to the axis.

6. The lubricating configuration of claim 1 in which a small duct is provided between the recess in the bore and a surface of the relatively rotatable member exposed to splashed oil of such size that pressure within the recess is not effective to push the oil out of the recess but suction action within the recess will draw oil into the recess.

7. The lubricating configuration of claim 6 in which the duct is directed into the bore from a surface likely to receive a regular supply of splashed oil.

8. The lubricating configuration of claim 5 in which a small duct is provided between each of the recesses in the bore and a surface of the relatively rotatable member exposed to splashed oil of such size that pressure within each recess is not effective to push the oil out of the recess but suction action within the recess will draw oil into the recess.

9. The lubricating configuration of claim 8 in which each duct is generally radially directed into the bore.

10. A lubricating configuration in an engine for a junction of relatively rotatable members employing a pin connection between the relatively rotatable members in an environment where at least periodically oil comes in contact with an external surface of the rotatable members at the junction, comprising
    a first relatively rotatable member provided with a first bore;
    a second relatively rotatable member provided with a second bore aligned with the first; and
    a pin extending through said bores and snugly received therein so that rotation between the pin and at least one of the relatively rotatable members occurs in the process
    wherein the bore of a member having rotatable movement relative to the pin is provided with at least one recess of crescent shaped cross section in a plane perpendicular to the bore axis whereby a pocket is provided between the bore of said member and the pin for accumulation of oil to lubricate the surfaces between the pin and the bore.

11. The lubricating configuration of claim 10 in which the recess within the bore is of crescent shape cross section in the plane perpendicular to the axis.

12. The lubricating configuration of claim 11 in which a pair of recesses on opposite sides of the bore from one another spaced inwardly from both ends of the bore are located so that a line extending from one recess to the other is generally transverse to the major component of linear motion of the pin.

13. The lubricating configuration of claim 10 in which the recesses are generally rectangular in their peripheral configuration in the bore.

14. The lubricating configuration of claim 10 in which a small duct is provided between the recess in the bore and a surface of the relatively rotatable member exposed to splashed oil of such size that pressure within the recess is not effective to push the oil out of the recess but suction action within the recess will draw oil into the recess.

15. The lubricating configuration of claim 14 in which the duct is generally radially directed into the bore.

16. In a piston construction employing a piston head, a piston arm and an interconnecting wrist pin wherein the piston head is provided with wrist pin supporting bearing block means shaped and positioned in the piston head to support the piston rod and having a bore through the bearing block means aligned axially with a bore in the piston rod and of a size to accommodate snugly the wrist pin,
    wherein on opposed sides of each bore within a bore which rotates relative to the pin, aligned transverse to the cylinder head axis, are recesses of crescent shaped cross section each of which provides a pocket for accumulating oil on each side of the wrist pin.

17. The piston configuration of claim 16 in which a small duct into the recess from the outer surface of the piston bearing, too small to permit a significant amount of reverse flow from the recess when oil is under pressure, provides oil access under suction forces to the recess from an outer surface exposed to oil splash.

18. The piston configuration of claim 17 in which each duct extends radially generally toward the bore axis to the center of the recesses.

19. A lubricating configuration in an engine for a junction of relatively rotatable members where oil is available to be fed between the rotatable members comprising:
    a relatively rotatable member provided with a bore;
    a sleeve bearing within the bore; and
    a member having a cylindrical bearing portion extending through said sleeve bearing and snugly received therein so that rotation between the sleeve bearing and the cylindrical bearing portion may occur,
    wherein the sleeve bearing is provided with at least one recess spaced inwardly from both ends of the bore whereby a pocket is provided between the sleeve bearing and the cylindrical bearing portion for accumulation of oil to lubricate between the surfaces of the cylindrical portion and the sleeve bearing.

20. The lubricating configuration of claim 19 in which a pair of recesses are provided on opposite sides of the sleeve bearing from one another spaced inwardly from both ends of the bore.

21. The lubricating configuration of claim 20 in which the sleeve bearing is split so as to provide mating halves and the recesses are provided at the split.

22. The lubricating configuration of claim 21 in which the relatively rotatable member itself is split at the bore and provided with means to clamp the two pieces together and hold them in place about the sleeve bearing and the cylindrical bearing portion.

23. The lubricating configuration of claim 22 in which the recesses are generally rectangular in their peripheral configuration in the bore.

24. The lubricating configuration of claim 23 in which the recess within the bore is of crescent shaped cross section in the plane perpendicular to the axis.

25. The lubricating configuration of claim 19 in which the sleeve bearing also moves relative to the bore of the relatively rotatable member and wherein the bore is also provided with at least one recess spaced inwardly from both ends of the bore whereby a pocket is provided between the bore of the member and the sleeve bearing for accumulation of oil to lubricate the surfaces of the bore and the outer surface of the sleeve bearing.

26. The lubricating configuration of claim 25 in which a pair of recesses are provided on opposite sides of the bore and a pair of recesses are provided on opposite sides of the sleeve bearing from one another, each pair of recesses being spaced inwardly from both ends of the bore.

27. The lubricating configuration of claim 26 in which the recesses in the bore are generally rectangular in their peripheral configuration in the bore.

28. The lubricating configuration of claim 27 in which the recesses within the bore are of crescent shaped cross section in the plane perpendicular to the axis.

29. In an engine comprising a plurality of cylinders and pistons for each cylinder and a crank shaft to which piston rods are connected and in turn are connected to the pistons with an interconnecting wrist pin, a bearing configuration comprising:
    sleeve bearings surrounding a cylindrical portion of the crank shaft extending between and through the bores of two adjacent piston rods, wherein on opposed sides of each sleeve bearing at each piston rod spaced inwardly from both ends of the bore are recesses of crescent shaped cross section, each of which recesses provides a pocket for accumulating oil on each side of the cylindrical portion of the crank shaft.

30. The engine construction of claim 29 in which recesses of crescent shaped cross section are provided in the bore of each piston arm surrounding the sleeve spaced inwardly from both ends of the bore, each of which provides a pocket for accumulation of oil.

31. The engine construction of claim 30 in which the sleeve bearing is composed of a split tubular member to facilitate installation.

* * * * *